United States Patent
Neil et al.

(10) Patent No.: US 8,180,118 B2
(45) Date of Patent: May 15, 2012

(54) FINGER SENSING DEVICE WITH SPOOF REDUCTION FEATURES AND ASSOCIATED METHODS

(75) Inventors: James W. Neil, Melbourne, FL (US); Joseph A. Tykowski, Oviedo, FL (US)

(73) Assignee: Authentec, Inc., Melbourne, FL (US)

( * ) Notice: Subject to any disclaimer, the term of this patent is extended or adjusted under 35 U.S.C. 154(b) by 1071 days.

(21) Appl. No.: 11/765,239

(22) Filed: Jun. 19, 2007

(65) Prior Publication Data

US 2007/0290124 A1    Dec. 20, 2007

Related U.S. Application Data

(60) Provisional application No. 60/805,149, filed on Jun. 19, 2006.

(51) Int. Cl.
*G06K 9/00* (2006.01)

(52) U.S. Cl. ........ 382/124; 382/125; 382/126; 382/128; 382/116; 382/134; 382/181; 382/190; 382/218; 382/276

(58) Field of Classification Search ............. 382/124, 382/125, 126, 128, 116, 134, 181, 190, 218, 382/276

See application file for complete search history.

(56) References Cited

U.S. PATENT DOCUMENTS

| | | | | |
|---|---|---|---|---|
| 5,953,441 | A * | 9/1999 | Setlak | 340/5.83 |
| 5,963,679 | A | 10/1999 | Setlak | 382/312 |
| 6,292,576 | B1 * | 9/2001 | Brownlee | 382/124 |
| 2003/0123714 | A1 | 7/2003 | O'Gorman et al. | 382/124 |
| 2003/0126448 | A1 * | 7/2003 | Russo | 713/186 |
| 2004/0252867 | A1 * | 12/2004 | Lan et al. | 382/124 |
| 2005/0089203 | A1 | 4/2005 | Setlak | 382/124 |
| 2006/0034493 | A1 | 2/2006 | Shimamura et al. | 382/115 |

FOREIGN PATENT DOCUMENTS

| | | |
|---|---|---|
| EP | 1302908 | 4/2003 |
| EP | 1708135 | 10/2006 |
| WO | WO 2005069212 | 7/2005 |

* cited by examiner

*Primary Examiner* — Mike Rahmjoo
(74) *Attorney, Agent, or Firm* — Allen, Dyer, Doppelt, Milbrath & Gilchrist, P.A.

(57) ABSTRACT

A finger sensing device may include a finger sensing area, at least one processing stage coupled to the finger sensing area and having at least one adaptively determined processing parameter, and a controller for spoof reduction. More particularly, the controller may determine a spoof attempt based upon a change in the at least one adaptively determined processing parameter. For example, the at least one adaptively determined processing parameter may include a feedback determined processing parameter. Accordingly, the finger sensing device has enhanced spoof reduction, since different materials, for example, will cause a change in an adaptive processing parameter and thereby indicate the attempted spoof.

21 Claims, 6 Drawing Sheets

FINGER SENSING DEVICE WITH SPOOF REDUCTION FEATURES AND ASSOCIATED METHODS

RELATED APPLICATION

This application is based upon provisional patent application 60/805,149, filed Jun. 19, 2006, the entire contents of which are incorporated herein by reference.

FIELD OF THE INVENTION

The present invention relates to the field of electronic devices, and, more particularly, to sensors, such as for finger sensing, and electronic devices using such sensors, and associated methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,963,679 to Setlak et al. and assigned to the assignee of the present invention. The fingerprint sensor is an integrated circuit sensor that drives the user's finger with an electric field signal and senses the electric field with an array of electric field sensing pixels on the integrated circuit substrate. Such sensors are used to control access for many different types of electronic devices such as computers, cell phones, personal digital assistants (PDA's), and the like. In particular, fingerprint sensors are used because they may have a small footprint, are relatively easy for a user to user and they provide reasonable authentication capabilities.

U.S. Published Patent Application No. 2005/0089203 also to Setlak, also assigned to the assignee of the present invention, and the entire contents of which are incorporated herein by reference. This application discloses an integrated circuit biometric sensor that may sense multiple biometrics of the user, and that is also adapted to either a static placement sensor or a slide finger sensor. The images collected may be used for matching, such as for authentication, or may be used for navigation, for example. The multiple biometrics, in addition to enhancing matching accuracy, may also be used to provide greater resistance to spoofing.

Another significant advance in finger sensing technology is disclosed in U.S. Pat. No. 5,953,441 also to Setlak et al., assigned to the assignee of the present invention, and the entire contents of which are incorporated by reference. This patent discloses a fingerprint sensor including an array of impedance sensing elements for generating signals related to an object positioned adjacent thereto, and a spoof reducing circuit for determining whether or not an impedance of the object positioned adjacent the array of impedance sensing elements corresponds to a live finger to thereby reduce spoofing of the fingerprint sensor by an object other than a live finger. A spoofing may be indicated and/or used to block further processing. The spoof reducing circuit may detect a complex impedance having a phase angle in a range of about 10 to 60 degrees corresponding to a live finger. The fingerprint sensor may include a drive circuit for driving the array of impedance sensing elements, and a synchronous demodulator for synchronously demodulating signals from the array of impedance sensing elements. The spoof reducing circuit may operate the synchronous demodulator at at least one predetermined phase rotation angle. The spoof reducing circuit may cooperate with the synchronous demodulator for synchronously demodulating signals at first and second phase angles and generating an amplitude ratio thereof, and may also compare the amplitude ratio to a predetermined threshold.

"Spoof" fingerprints are typically made using natural and artificial materials, such as gelatin, gum, gummy bears, meat products, clay, Play-Doh, auto body filler, resins, metal, etc. that can be used to imitate the ridges and valleys present in a real fingerprint. As it is desirable to be able to acquire a fingerprint image under any skin condition (dry, moist, etc.) some fingerprint sensors employ real-time gain and other adjustments to obtain the best possible images. In doing so, sensors that detect fingerprints using these approaches are sometimes susceptible to attack using spoofs because these systems are capable of imaging widely varying skin conditions (and other materials). In summary, previous work in the area of spoof detection and reduction may be considered as having used: A.) impedance classification: determining the impedance characteristics of a material over some frequency range; B.) optical dispersion characteristics; C.) thermal measurements; D.) phase setting and signal amplitude; and E.) finger settling detection.

SUMMARY OF THE INVENTION

In view of the foregoing background, it is therefore an object of the present invention to provide a finger sensing device with enhanced spoof reduction and related methods.

This and other objects, features and advantages in accordance with the present invention are provided by a finger sensing device comprising a finger sensing area, at least one processing stage coupled to the finger sensing area and having at least one adaptively determined processing parameter, and a controller for spoof reduction. More particularly, the controller may determine a spoof attempt based upon a change in the at least one adaptively determined processing parameter. For example, the at least one adaptively determined processing parameter may comprise a feedback determined processing parameter. Accordingly, the finger sensing device has enhanced spoof reduction, since different materials, for example, will cause a change in a processing parameter and thereby indicate the attempted spoof.

The at least one adaptively determined processing parameter may comprise a plurality thereof defining a processing parameter pattern. Accordingly, the controller may determine the attempted spoof based upon a comparison of a current processing parameter pattern with a prior processing parameter pattern.

In accordance with another advantageous feature of the finger sensing device, the controller may determine the attempted spoof further based upon at least one other biometric indicator. For example, the finger sensing area may comprise a finger swipe sensing area, and the at least one other biometric indicator may comprise a finger swipe speed.

The at least one processing stage may comprise at least one of a digital processing stage and an analog processing stage. The at least one adaptively determined processing parameter may comprise at least one of a gain and an offset, for example.

In some embodiments, the at least one adaptively determined processing parameter is determined after image sampling. In other embodiments, the at least one adaptively determined processing parameter is determined during image sampling.

The finger sensing area may comprise at least one of an electric field finger sensing area, a capacitive finger sensing area, an optical finger sensing area, and a thermal finger sensing area. In addition, the finger sensing device may be used in an electronic device, such as including a housing, a display carried by the housing, and with the finger sensing area carried by the housing. The electronic device may also include at least one processing stage coupled to the finger sensing area and having at least one adaptively determined processing parameter, and with the controller for determining a spoof attempt based upon a change in the at least one adaptively determined processing parameter.

A method aspect is for spoof reduction using a finger sensing device comprising a finger sensing area and at least one processing stage coupled thereto, with the at least one processing stage having at least one adaptively determined processing parameter. The method may include using a controller to determine a change in the at least one adaptively determined processing parameter indicative of a spoof attempt.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout to indicate similar elements, and prime notation is used to indicate similar elements in alternative embodiments.

Figure 1:
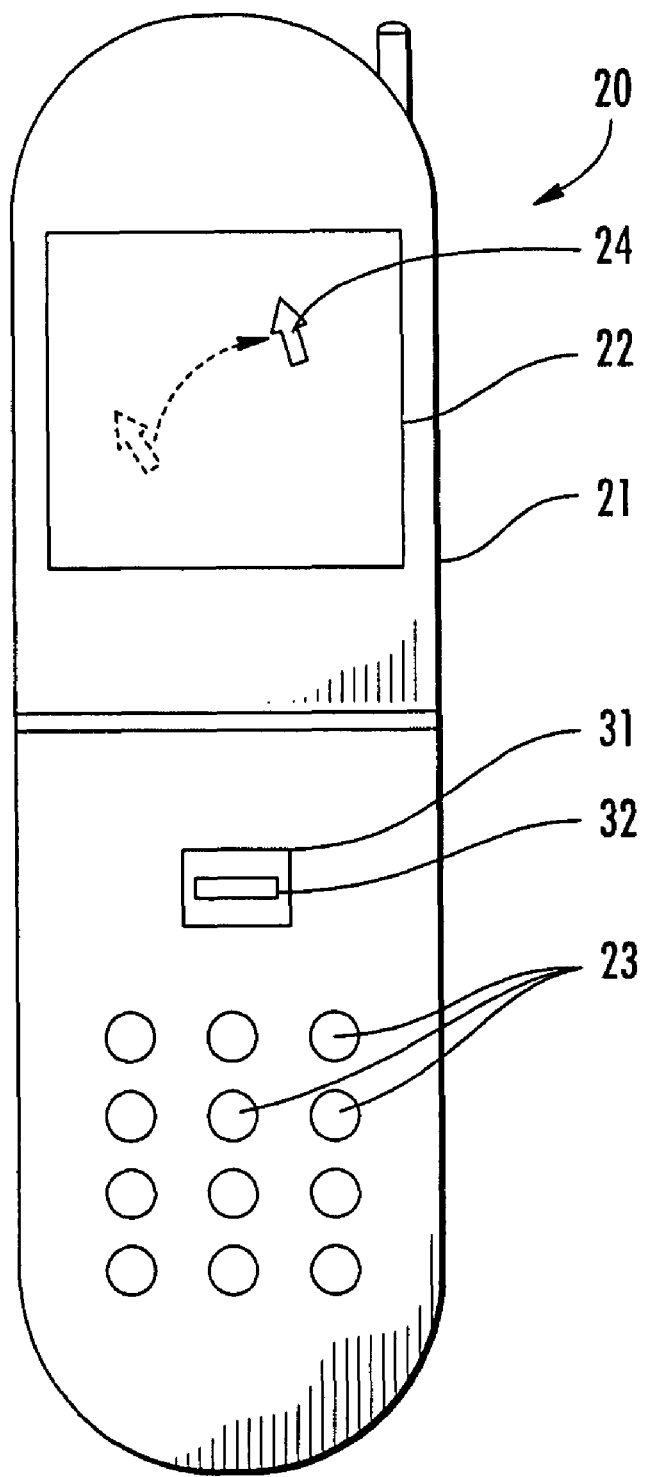
FIG. 1 is schematic front elevational view of an electronic device in the form of a cellular telephone and including a finger sensing device in accordance with the present invention.
Figure 2:
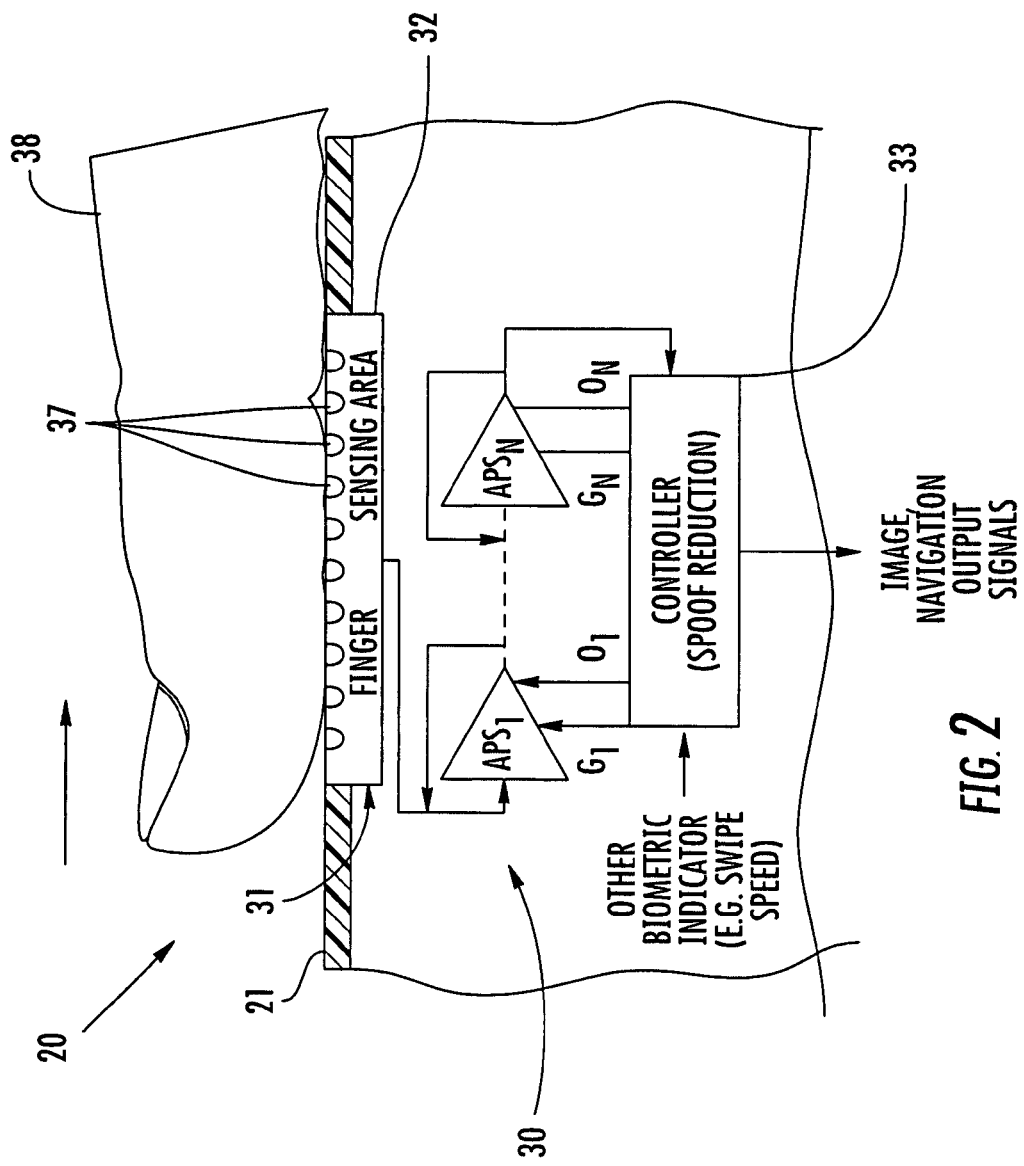
FIG. 2 is more detailed schematic diagram of a portion of the cellular telephone as shown in FIG. 1.

Referring initially to FIGS. 1 and 2 an electronic device in the form of a cellular telephone 20 includes the finger sensing device 30 according to the invention. The cellular telephone 20 is but one example of an electronic device that may benefit from the finger sensing device 30 as will be appreciated by those skilled in the art. The illustrated cellular telephone 20 includes a portable housing 21 that carries a display 22 and a keyboard 23. An integrated circuit finger sensor 31 is carried by the housing 21 and includes a finger sensing area 32 to receive a user's finger 38 (FIG. 2) moved in a sliding motion.

The finger sensing area 32 may typically sense the image of ridges and valleys of a fingerprint, or may image other features of the user's finger, such as pores, or even subdermal features, as will be appreciated by those skilled in the art. Of course, other finger sensors could also be used.

The finger sensor 31 illustratively includes a controller 33 cooperating with the finger sensing area 32 for collecting image data therefrom. In some embodiments, the controller 33 may be provided by processing circuitry included on the integrated circuit substrate with the finger sensing area 32, and a host processor (not shown) as typically carried by the housing 21. Such a host processor for the cellular telephone 20 may typically perform the traditional processing for telephone functions, and may also have additional processing capability available for finger matching, finger navigation, etc. as will be appreciated by those skilled in the art. In other embodiments, the controller 33 may be implemented totally along with the finger sensing area 32 or in a separate integrated circuit as will also be appreciated by those skilled in the art.

The finger sensing area 32 illustratively includes an array of sensing pixels, such as electric field sensing pixels 37 formed on an integrated circuit substrate of the type as described in U.S. Pat. No. 5,963,679 to Setlak et al., assigned to the assignee of the present invention, and the entire contents of which are incorporated herein by reference. Of course, the finger sensing device 30 may be based upon other types of finger sensing as will be appreciated by those skilled in the art. For example, the finger sensing area 32 may comprise at least one of an electric field finger sensing area, a capacitive finger sensing area, an optical finger sensing area, and a thermal finger sensing area.

The finger sensing area 32 is operatively coupled to at least one adaptive processing stage. More typically, and as shown in the illustrated embodiment, a plurality of such processing stages $APS_1$, $APS_N$ are used and connected in serial and/or parallel. As will also be readily appreciated by those skilled in the art, the processing stages $APS_1$, $APS_N$ may comprise digital and/or analog processing stages. Each processing stage $APS_1$, $APS_N$ may have one or more adaptively determined processing parameter associated therewith. For example, an adaptively determined processing parameter may be a feedback determined processing parameter. Gain values $G_1$, $G_N$ and/or offset values $O_1$, $O_N$ may be provided by the controller 33, as shown in the illustrated embodiment and/or generated within the processing circuitry itself. Those of skill in the art will appreciate yet further such adaptively determined processing parameters.

An objective of finger sensing device 30 is to discern a real fingerprint from a spoof through the use of one or more biometric indicators. By using one or more biometric indicators, the task of constructing a usable spoof becomes increasingly difficult, thus increasing the security provided by biometric fingerprint authentication sensors and systems.

In a closed loop system, feedback stages are typically used to adjust gain control parameters to provide the best possible image quality. The gain parameters can be thought of in broad terms as contrast, brightness, or sharpness controls, for example. While acquiring an image, a number of gain control parameters are individually adjusted to produce the best possible image quality. The adjustment process may occur in real-time, either in an analog fashion, or in a digitally controlled manner. The finger sensing device 30 makes use of the patterns which evolve when adjusting the gain parameters for different materials. As each material is presented to the sensor 30, the various gain controls may adjust or adapt in real-time to provide the best image quality. It has been observed that different materials cause the gain control adjustments to behave differently. By comparing the manner in which the gain settings are affected over time between a real finger and a spoof, it is possible for the sensor 30 to discriminate a real finger from a spoof.

Figure 3:
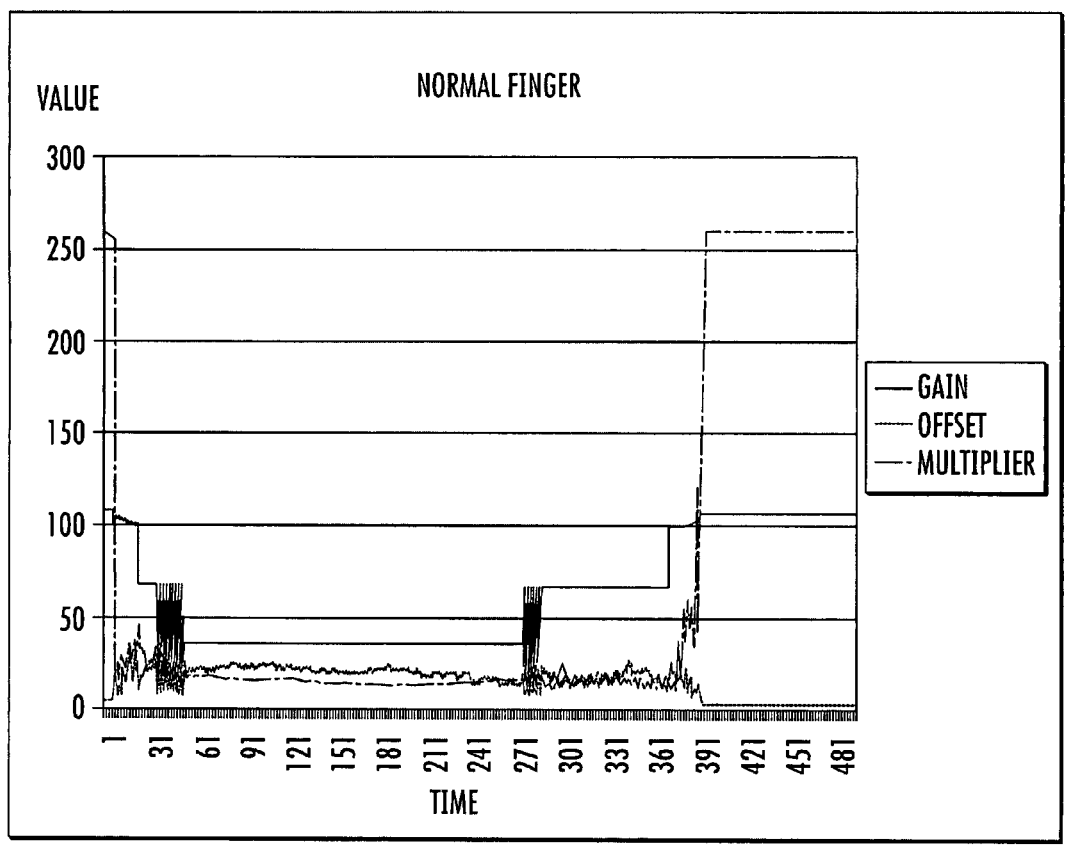
FIG. 3 is a graph of several adaptively determined processing parameters for a normal finger as may be determined using the finger sensing device of FIG. 1.
Figure 4:
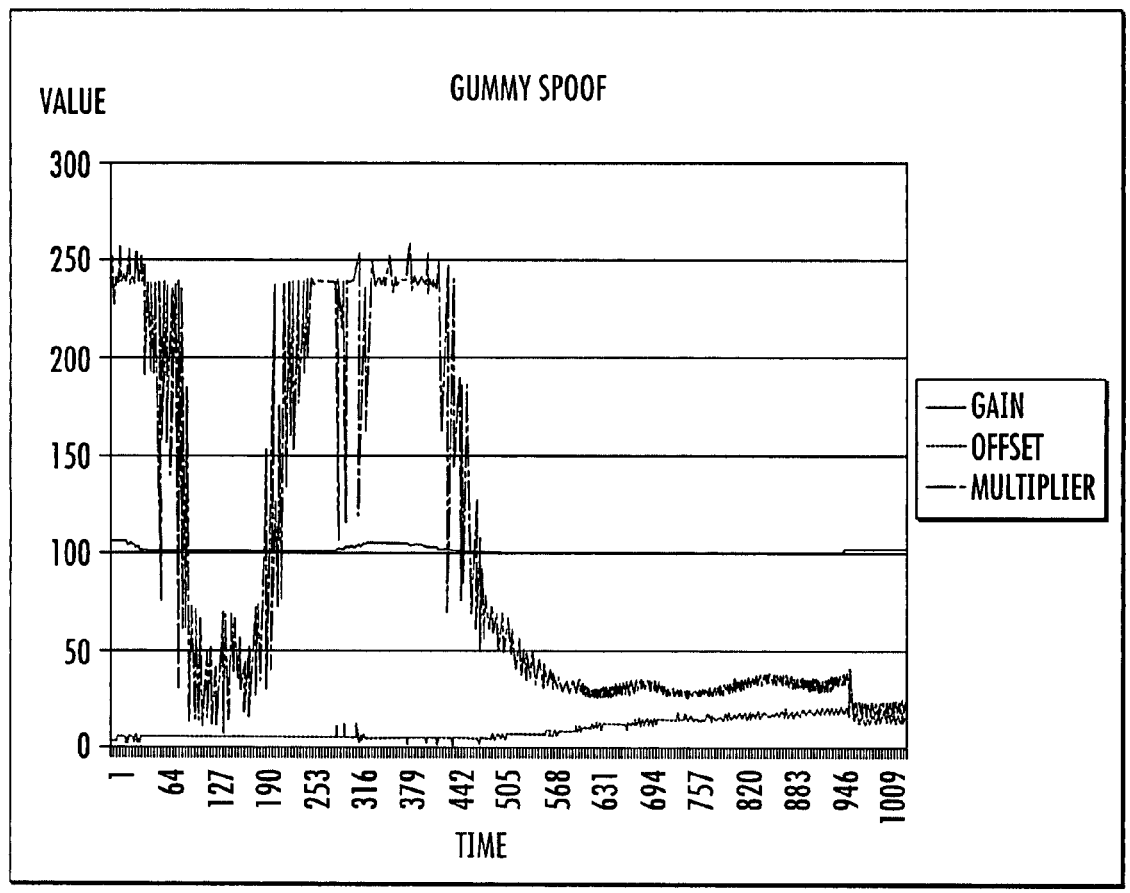
FIG. 4 is a graph of several adaptively determined processing parameters for a spoof attempt as may be determined using the finger sensing device of FIG. 1.

Referring now additionally to FIGS. 3 and 4, the real-time control responses of three adaptively determined processing parameters are described for a real finger (FIG. 3) compared to the response for a gummy spoof (FIG. 4). The Gain is an analog processing signal, while the Offset and Multiplier signals are digital processing signals. It is clear that the control response itself can be used as a biometric indicator. One would expect natural variations in the magnitude of the real-time response over time due to many factors, including temperature, humidity, and skin condition. However, the overall responses of the real finger as shown in FIG. 3 will not typically change in such a significant manner as to look like the changed response of the spoof attempt shown in FIG. 4.

The control response demonstrated above can also be advantageously coupled with other approaches to strengthen the spoof rejection capability. For instance, many forms of spoofs (like gummy spoofs) have a limited number of uses. They tend to wear down rapidly, causing smudges or complete discontinuities in the generated fingerprint images. Because they are of limited use, an individual trying to use a spoof would typically have to "swipe" the spoof across the sensor at a much slower rate (to prevent wearing out the ridges) than the typical user would using a real finger. It is hypothesized that users of fingerprint systems tend to develop a natural rate at which they swipe fingerprint sensors. By comparing the current swipe speed with a typical value associated with the matched user, anomalous swipe rates can be detected, possibly indicating the presence of a spoof.

A significant concern from spoofs comes from the ability to lift a latent fingerprint and construct a 3-D representation of the ridges and valleys. Because normal variations would also be expected from person-to-person and finger-to-finger, finding a spoof material that would mimic the enrolled user's control response would in itself be difficult. By combining multiple biometric indicators, a spoof would have to mimic the control response of the enrolled user, and have a swipe rate that is consistent with the enrolled user's typical swipe rate before access would be granted. Each incremental biometric indicator decreases the likelihood of gaining access with a spoof as will be readily appreciated by those skilled in the art. In other words, the controller 33 (FIG. 2) may determine the attempted spoof further based upon at least one other biometric indicator. For example, the finger sensing area 32 may comprise a finger swipe sensing area, and the at least one other biometric indicator may comprise a finger swipe speed either input to the controller 33 from external circuitry or, more typically, generated internally within the controller as will be appreciated by those skilled in the art.

The spoof reduction techniques described herein have the following advantages over implementations, such as impedance, optical, and thermal imaging:

1. They can be used with a wide variety of sensors. Any sensor that has some form of feedback mechanism to adjust image quality can employ these techniques. As such, these techniques may be applicable not only to RF-based (electric field) sensors, but to capacitive, optical, and thermal technologies as well.
2. Approaches, such as impedance, optical, or thermal imaging typically require multi-modal hardware to sense the additional parameters that they are measuring. The ability to control and/or monitor the adaptively determined processing parameters over time is often available in a digitally controlled manner. Analog control loops may also be readily modified to sense and convert the feedback paths to provide parameter or control loop monitoring. Using these techniques will result in reduced cost and complexity when compared to multi-modal techniques.
3. The techniques described herein can be retrofitted into some systems using sensors currently available through software only approaches, resulting in low cost and increased security.
4. The techniques address a wide range of spoofing materials by comparing the obtained results against a set of expected results. This would make it increasingly difficult to prepare a spoof material that could be used to simulate a broad range of fingers.
5. In sensors employing an external feedback control mechanism (such as a sensor under CPU control), the feedback parameters may only need to be stored for post processing. Since the parameters are already being computed, the overhead to store the parameters may be minimal. This reduces program complexity and improves the speed at which a spoof can be detected. Reduced complexity makes the algorithms suitable for lower-end CPU's, typically reducing system cost, or reducing CPU cycles, reducing power consumption when compared to multi-modal sensors, for example.
6. The techniques described herein can also be applied to multi-modal sensors. Control loops present in multi-modal sensors can also be monitored for specific response patterns.

Figure 5:
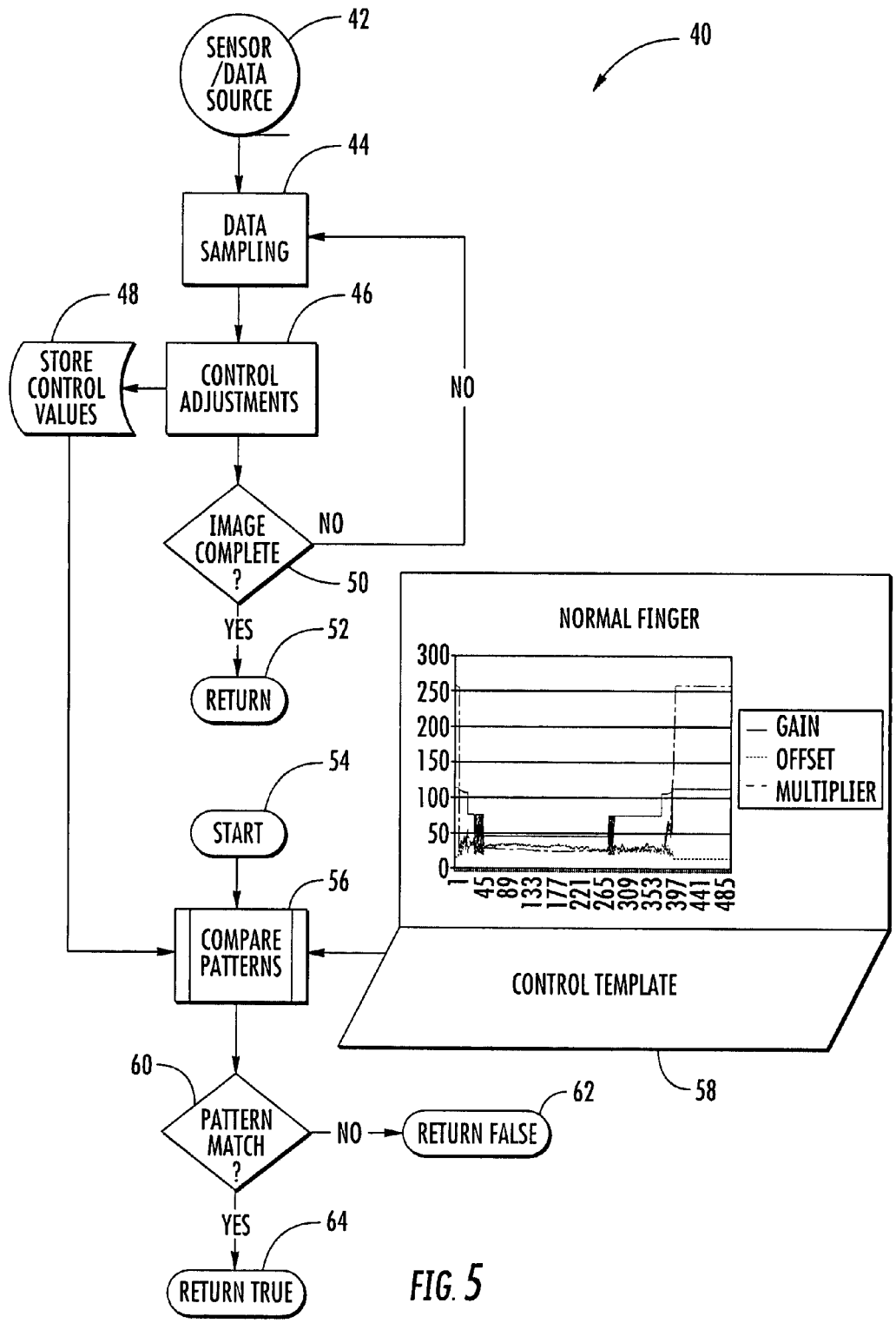
FIG. 5 is a flowchart of a method embodiment in accordance with the present invention.

Referring now additionally to the flowchart 40 of FIG. 5, a method aspect is now described. Data is sampled at Block 44 from the source Block 42. Control adjustments are made at Block 46 and which are stored at Block 48. If the image is complete (Block 50), then the process proceeds to the return Block 52. As shown in the lower portion of FIG. 5, from the start (Block 54), the adaptively determined processing parameters defining patterns are compared at Block 56 with a normal finger pattern from the template Block 58. If the patterns match sufficiently at Block 60, the method returns a TRUE value at Block 64, and otherwise returns a FALSE value at Block 62. Accordingly, the flowchart 40 depicts an implementation that monitors and/or computes changes to the controls in real-time as an image is acquired. Every control value does not need to be stored: it would be sufficient to store only significant changes to reconstruct the control pattern from the data. Storing only significant changes will result in smaller data sets for reconstructing the control pattern. The advantage of real-time acquisition is in the finer granularity of control variables for more precise pattern matching. For some spoof materials, a more precise measurement may be beneficial.

As shown in the flowchart 40 of FIG. 5, as each subsequent image (or group of images) is acquired, the image data is sampled. Based on the image data, control settings are adjusted to provide feedback. The new control settings are stored for subsequent processing. When the complete image has been acquired, data sampling and control adjustments are no longer made. The control values obtained during image acquisition are used to perform pattern matching/verification against a previously created control template.

Figure 6:
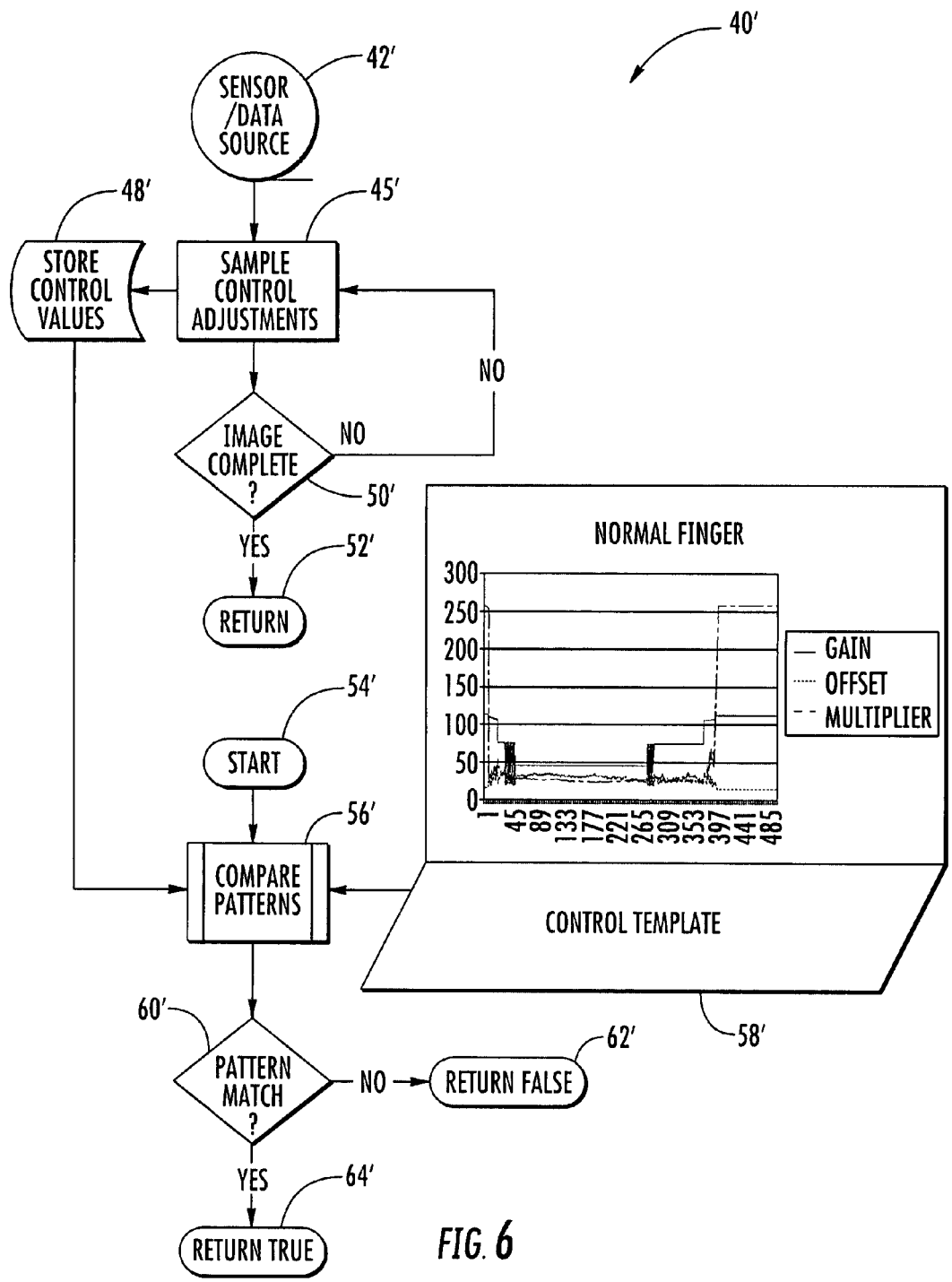
FIG. 6 is a flowchart of another method embodiment in accordance with the present invention.

The flowchart 40' of FIG. 6 illustrates an implementation that only samples the control values as the images are acquired. Those other portions are indicated with prime reference numbers and need no further discussion herein. The control values do not need to be recorded at a specific rate, but they should desirably be sampled sufficiently fast to present enough data points to reconstruct the control pattern from the control data. Sampling the control values may yield smaller data sets for reconstructing the control pattern. The advantage of using a control sampling approach is lower power, and reduced memory requirements. In this embodiment, the control values are sampled. The sampled control settings are stored for subsequent processing. When the complete image has been acquired, control samples are no longer taken. The control values obtained during image acquisition are used to perform pattern matching. As will be readily appreciated by those skilled in the art, the two implementations explained above with reference to FIGS. 5 and 6 are not the exclusive implementations, and many other implementations are possible.

Returning again to the schematic diagram of FIG. 2, the method is directed to spoof reduction using a finger sensing device 30 comprising a finger sensing area 32 and at least one processing stage coupled thereto, with the at least one processing stage having at least one adaptively determined processing parameter. The method may include using a controller 33 to determine a change in the at least one adaptively determined processing parameter $APS_1$, $APS_N$ indicative of a spoof attempt. Indeed, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A finger sensing device comprising:
   a finger sensing area;
   at least one processing stage coupled to said finger sensing area and having at least one adaptively determined processing parameter comprising a gain and an offset; and
   a controller for determining a spoof attempt based upon a change in both the gain and offset of the at least one adaptively determined processing parameter.

2. The finger sensing device according to claim 1 wherein the at least one adaptively determined processing parameter comprises a plurality thereof defining a processing parameter pattern; and wherein said controller determines the attempted spoof based upon a comparison of a current processing parameter pattern with a prior processing parameter pattern.

3. The finger sensing device according to claim 1 wherein said controller determines the spoof attempt further based upon at least one biometric indicator.

4. The finger sensing device according to claim 3 wherein said finger sensing area comprises a finger swipe sensing area; and wherein the at least one biometric indicator comprises a finger swipe speed.

5. The finger sensing device according to claim 1 wherein the at least one processing stage comprises at least one digital processing stage.

6. The finger sensing device according to claim 1 wherein the at least one processing stage comprises at least one analog processing stage.

7. The finger sensing device according to claim 1 wherein the at least one adaptively determined processing parameter is determined after image sampling.

8. The finger sensing device according to claim 1 wherein the at least one adaptively determined processing parameter is determined during image sampling.

9. The finger sensing device according to claim 1 wherein said finger sensing area comprises at least one of an electric field finger sensing area, a capacitive finger sensing area, an optical finger sensing area, and a thermal finger sensing area.

10. An electronic device comprising:
    a housing;
    a display carried by said housing;
    a finger sensing area carried by said housing;
    at least one processing stage coupled to said finger sensing area and having at least one adaptively determined processing parameter comprising a gain and an offset; and
    a controller for determining a spoof attempt based upon a change in both the gain and offset of the at least one adaptively determined processing parameter.

11. The electronic device according to claim 10 wherein the at least one adaptively determined processing parameter comprises a plurality thereof defining a processing parameter pattern; and wherein said controller determines the attempted spoof based upon a comparison of a current processing parameter pattern with a prior processing parameter pattern.

12. The electronic device according to claim 10 wherein said controller determines the spoof attempt further based upon at least one biometric indicator.

13. The electronic device according to claim 12 wherein said finger sensing area comprises a finger swipe sensing area; and wherein the at least one biometric indicator comprises a finger swipe speed.

14. The electronic device according to claim 10 wherein the at least one processing stage comprises at least one of a digital processing stage and an analog processing stage.

15. The electronic device according to claim 10 wherein said finger sensing area comprises at least one of an electric field finger sensing area, a capacitive finger sensing area, an optical finger sensing area, and a thermal finger sensing area.

16. A method for spoof reduction using a finger sensing device comprising a finger sensing area and at least one processing stage coupled thereto, the at least one processing stage having at least one adaptively determined processing parameter comprising a gain and an offset, the method comprising:
    using a controller to determine a change in the both the gain and offset of the at least one adaptively determined processing parameter indicative of a spoof attempt.

17. The method according to claim 16 wherein the at least one adaptively determined processing parameter comprises a plurality thereof defining a processing parameter pattern; and wherein using the controller comprises using the controller to determine the spoof attempt based upon a comparison of a current processing parameter pattern with a prior processing parameter pattern.

18. The method according to claim 16 further comprising using the controller to determine the spoof attempt further based upon at least one biometric indicator.

19. The method according to claim 18 wherein the finger sensing area comprises a finger swipe sensing area; and wherein the at least one biometric indicator comprises a finger swipe speed.

20. The method according to claim 16 wherein the at least one processing stage comprises at least one of a digital processing stage and an analog processing stage.

21. The method according to claim 16 wherein the finger sensing area comprises at least one of an electric field finger sensing area, a capacitive finger sensing area, an optical finger sensing area, and a thermal finger sensing area.

* * * * *